US009509656B2

(12) United States Patent
Matsen

(10) Patent No.: US 9,509,656 B2
(45) Date of Patent: Nov. 29, 2016

(54) BROADCAST DISTRIBUTION TABLE FOR BACNET/IP

(71) Applicant: Honeywell International Inc., Morristown, NJ (US)

(72) Inventor: Dean C. Matsen, Shoreline, WA (US)

(73) Assignee: Honeywell International Inc., Morris Plains, NJ (US)

( * ) Notice: Subject to any disclaimer, the term of this patent is extended or adjusted under 35 U.S.C. 154(b) by 327 days.

(21) Appl. No.: 14/160,944

(22) Filed: Jan. 22, 2014

(65) Prior Publication Data

US 2015/0207773 A1 Jul. 23, 2015

(51) Int. Cl.
*G06F 15/16* (2006.01)
*H04L 29/12* (2006.01)

(52) U.S. Cl.
CPC ....... *H04L 61/1552* (2013.01); *H04L 61/1511* (2013.01)

(58) Field of Classification Search
None
See application file for complete search history.

(56) References Cited

U.S. PATENT DOCUMENTS

| 8,174,962 | B2 | 5/2012 | Ramanathan et al. | |
|---|---|---|---|---|
| 2003/0212821 | A1* | 11/2003 | Gillies | H04L 12/2697 709/238 |
| 2004/0039827 | A1* | 2/2004 | Thomas | H04L 29/06 709/228 |
| 2010/0280636 | A1* | 11/2010 | Holland | G05B 19/00 700/90 |
| 2012/0062360 | A1 | 3/2012 | Wendt | |
| 2012/0110158 | A1* | 5/2012 | Koch | H04L 12/2816 709/223 |
| 2013/0085614 | A1* | 4/2013 | Wenzel | F24F 11/006 700/277 |

FOREIGN PATENT DOCUMENTS

JP 2007096539 4/2007

OTHER PUBLICATIONS

ASHRAE, "Proposed Addendum ai to Standard 135-2012, BACnet—A Data Communication Protocol for Building Automation and Control Networks," Fourth Public Review, 34 pages, Mar. 2014, Copyright 2013.
"BACnet/IP=BACnet + Intrinsic IP," 1 page, printed Sep. 25, 2013.
"BACnet/IP, More BDT Management," 1 page, printed Sep. 25, 2013.
Contemporary Control Systems, Inc., "BACnet Discovery Tool Better than Ever but Still Free!" Essentials, vol. 3, Issue 5, 5 pages, 2011.
Eriksson et al., "Scalable Ad Hoc Routing: The Case for Dynamic Addressing," IEEE, pp. 1108-1119, 2004.
http://tech.groups.yahoo.com/group/bacnet-ip-wg/message/14, "FW: BACnet/IP and NAT Routers," 9 pages, printed Mar. 1, 2013.
http://tech.groups.yahoo.com/group/bacnet-ip-wg/message/290, "Message RE [bacnet ip-wg], NPO Question for Consideration," 6 pages, Mar. 1, 2013.
Saia Burgess, "Controls News Automation with Saia PCD," Edition No. 11, 76 pages, 2008/2009.
"Test Your ADSL Speed," 1 page, printed Sep. 5, 2013.
"IP-WG Meeting Minutes," 3 pages, Sep. 29, 2005.

* cited by examiner

*Primary Examiner* — Viet Vu
*Assistant Examiner* — James Edwards
(74) *Attorney, Agent, or Firm* — Seager, Tufte & Wickhem, LLP

(57) ABSTRACT

A system for providing addresses to a broadcast distribution table. A BACnet device may have an internet protocol, be connectable to a name server via a network, and have a broadcast distribution table. The BACnet device may also have a shadow name table. A name may be looked up in the shadow name table to obtain an address associated with the name. The address may be copied into the broadcast distribution table. There may be one or more additional BACnet devices, each having a protocol, being connectable to a network, and having a broadcast distribution table. The first BACnet device may provide and update the broadcast distribution table of each additional BACnet device with information from the broadcast distribution table of the first BACnet device via the network.

18 Claims, 3 Drawing Sheets

BROADCAST DISTRIBUTION TABLE FOR BACNET/IP

BACKGROUND

The present disclosure pertains to communications and particularly to communication and control systems for components of buildings. More particularly, the disclosure pertains to communication protocols.

SUMMARY

The disclosure reveals a system for providing addresses to a broadcast distribution table. A BACnet device may have a protocol, be connectable to a name server via a network, and have a broadcast distribution table. The BACnet device may also have a shadow name table. A name may be looked up in the shadow name table to obtain an address associated with the name. The address may be copied into the broadcast distribution table. There may be one or more additional BACnet devices, each having a protocol, being connectable to a network, and having a broadcast distribution table. The first BACnet device may provide and update the broadcast distribution table of each additional BACnet device with information from the broadcast distribution table of the first BACnet device via the network or other connection. An agent, such as a software program in a memory, may look up one or more names in the shadow name table and copy addresses associated with the names, respectively, to the broadcast distribution table. To keep the broadcast distribution table updated, the agent may periodically look up one or more names in the shadow name table and copy one or more addresses associated with the one or more names, respectively, to the broadcast distribution table. The broadcast distribution table may be a domain name system driven BACnet standard table.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

A BACnet™ standard, Annex J of ANSI/ASHRAE (American Society of Heating/Refrigerating and Air-Conditioning Engineers), may be a communications protocol for building automation and control networks. It may define an approach for using BACnet over IP (internet protocol) networks. The approach may be based on fixed IP addresses. There may be a strong demand for DNS (domain name system) based addressing (dynamic IP addresses).

There may be a way where a BACnet/IP network can be extended in a mostly standard fashion to take dynamic addresses into account. The DNS may be a technique for looking up a machine's IP address using its name (e.g., www.google.com (name) which can be resolved to an IP address). The BACnet standard does not necessarily have any place to store names, so extending the standard may be complicated.

Some meta-data outside of the standard data may be defined, and the meta-data may be used to update and maintain the standard data. The resulting solution may be different but yet compatible.

BACnet may have a mode for reading and writing a BDT (broadcast distribution table) from a device, but its format may be based on static IP addresses only. For devices to support the DNS-driven scheme, a separate, non-standard table of names should be kept. Each name may correspond to one of the static IP addresses in the standard scheme. Devices supporting the DNS-driven scheme should periodically look up the IP addresses of the names and store the results relative to the standard IP addresses. The non-standard table may also contain IP addresses for some devices that do not have any names. In such cases, the IP address may simply be copied into the standard table. Ultimately, the meta-data may drive the standard BDT, not necessarily the other way around.

When in such a mode, the device would not necessarily accept a BDT in a standard BACnet form, because it may over-write the results of the name lookups. Other standard BACnet devices may, however, be able to fetch the results from a DNS-driven device and use them in a normal standard way.

The present system and approach may pertain to building management, automation and control.

Figure 1:
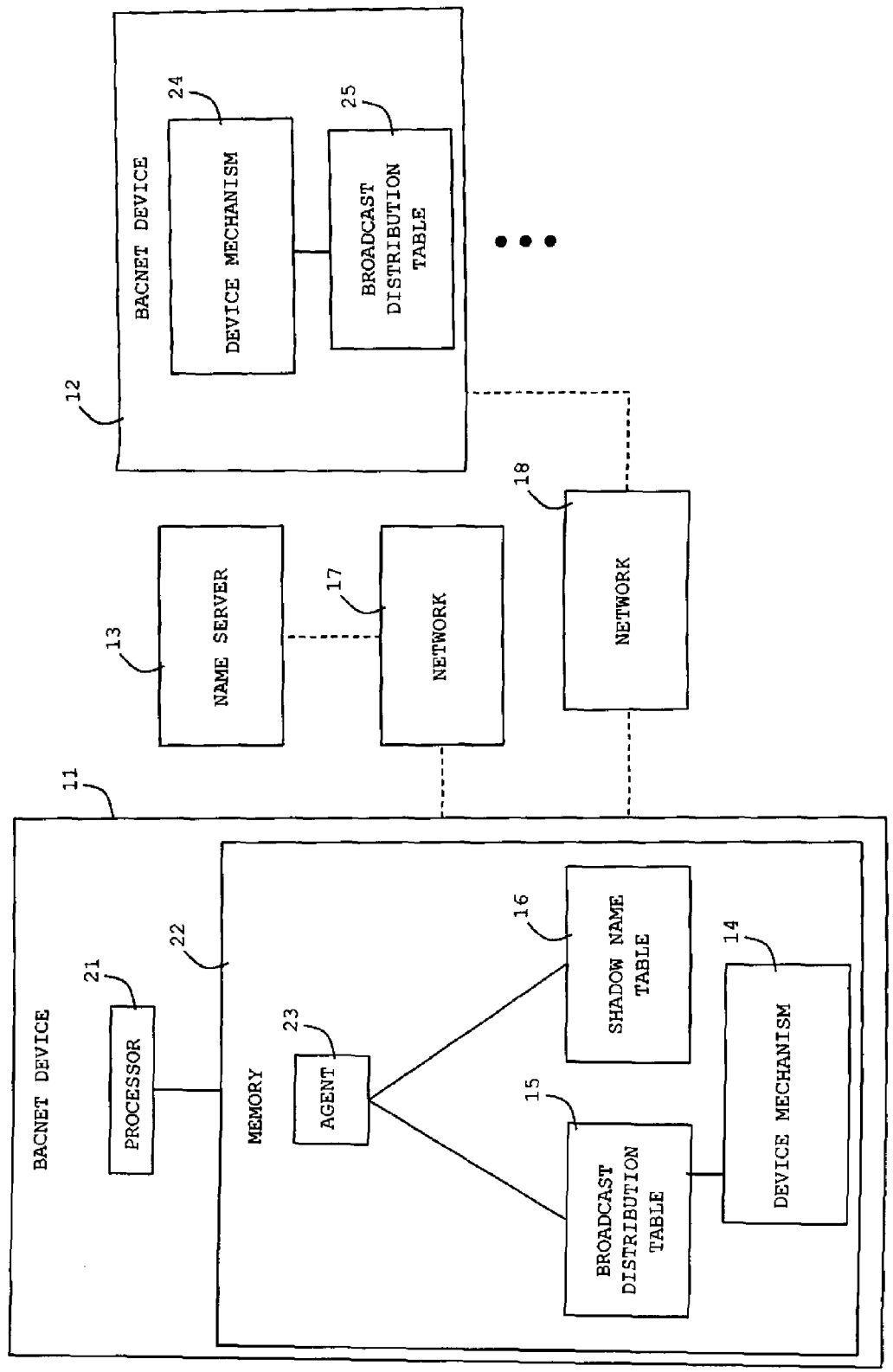
FIG. 1 is a diagram of a BACnet device having a broadcast distribution table and a shadow name table.

FIG. 1 is a diagram of an illustrative example of a setup that may incorporate the present system and approach. A BACnet device 11 may be connected to a name server 13 via a network 17. BACnet device 11 may incorporate a memory 22 having an agent 23, a broadcast distribution table 15 connected to agent 23, a device mechanism 14 connected to broadcast distribution table 15, and a shadow name table 16 connected to agent 23. A processor 21 may be connected to memory 22. BACnet device 11 may have an internet protocol and be connectable to a network 17.

Agent 23 may look up names in shadow name table 16 and copy addresses associated with the names, respectively, to broadcast distribution table 15. Also, agent 23 may keep broadcast distribution table 15 updated.

Agent 23 may be a software program executed by processor 21. Agent 23 may periodically look up one or more names in shadow name table 16 and copy one or more addresses associated with the one or more names, respectively, to broadcast distribution table 15. Broadcast distribution table 15 may be a BACnet standard table and be a domain name system driven table.

Another BACnet device 12 may have a BACnet protocol and be connectable to network 18. BACnet device 12 may have a device mechanism 24 and a broadcast distribution table 25. BACnet device 11 may provide and update broadcast distribution table 25 of BACnet device 12 with information from broadcast distribution table 15 of BACnet device 11 via network 18. Broadcast distribution tables 15 and 25 may be domain name system driven.

Additional BACnet devices like BACnet device 12 may be connectable to network 18. Broadcast distribution tables of the additional BACnet devices may be provided and updated with information from broadcast distribution table 15 of BACnet device 11 via network 18.

A path (network 17) between a computer and name server (DNS) may use an internet protocol. A path (network 18) between two BACnet devices for updating the broadcast distribution table 25 may be a BACnet protocol. Even though the diagram of FIG. 1 shows these paths as two separate networks, the paths could share the same wire and be regarded as the same "network".

Figure 2:
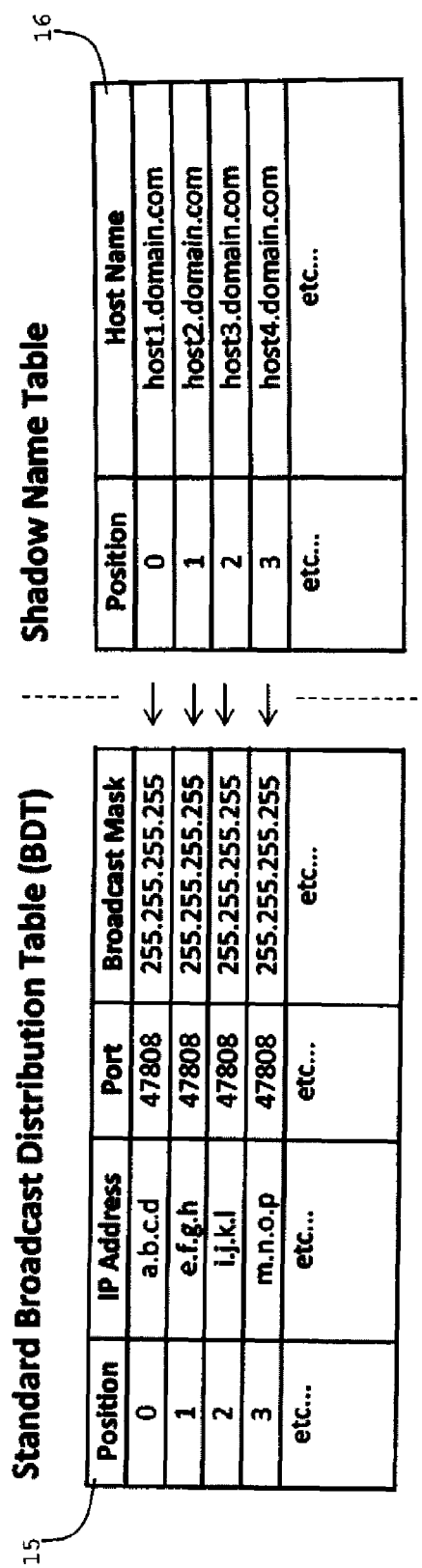
FIG. 2 is a diagram of the broadcast distribution table and a shadow name table with some details.

FIG. 2 is a diagram showing details of standard broadcast distribution table 15 and a shadow name table 16. Table 15 may have one or more rows. Each row may reveal a position, an IP address, a port and a broadcast mask. Table 16 may have one or more rows corresponding to the one or more rows, respectively, of table 15. Each row of table 16 may reveal a position and a host name. For a given position, a name may be looked up in table 16 to obtain an address associated with the name. The address may be copied into table 15.

Examples of positions of tables 15 and 16 that correspond to one another may be 0, 1, 2, 3, and so on. Examples of IP addresses corresponding to the positions of table 15 may incorporate: a.b.c.d; e.f.g.h; i.j.k.l; m.n.o.p; and so on. An example port corresponding to the positions of table 15 may be 47808. An example of a broadcast mask corresponding to the positions of table 15 may be 255.255.255.255. Examples of host names corresponding to the positions of table 16 may incorporate: host1.domain.com; host2.domain.com; host3.domain.com; host4.domain.com; and so forth.

Figure 3:
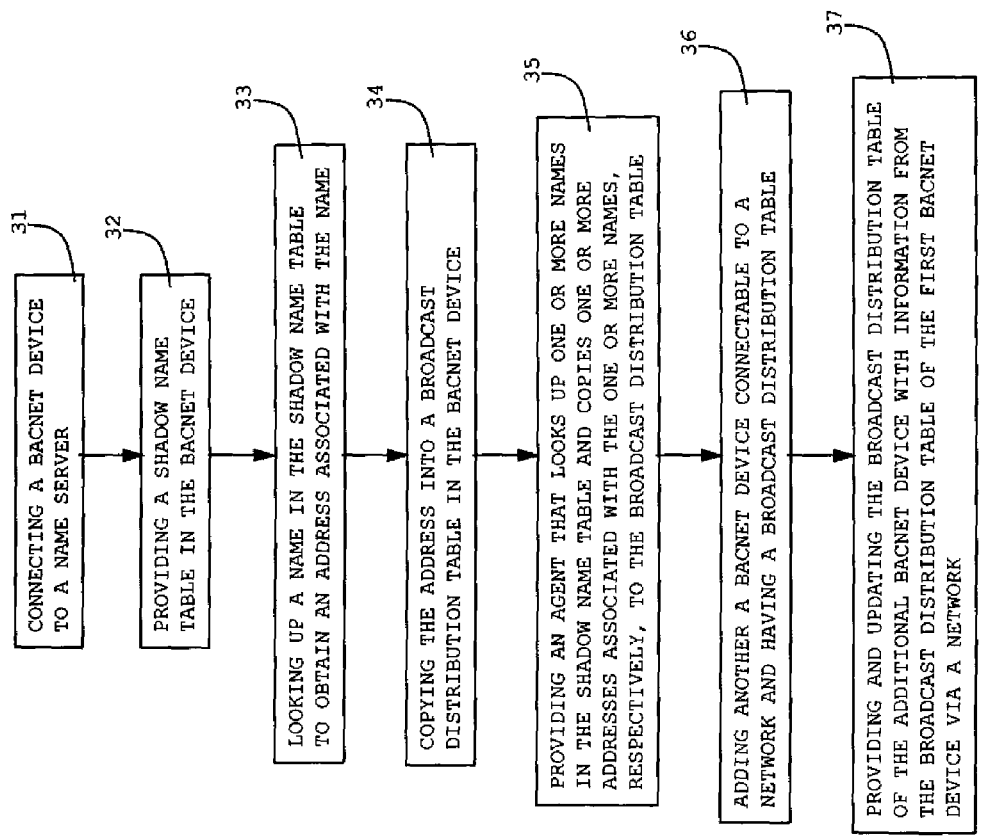
FIG. 3 is a diagram of an example flow of activity for the present system and approach.

FIG. 3 is a diagram showing an example flow of activity of the present system and approach. Elements of the activity may have different content and arrangements than that shown in the Figure. An element may be represented by a block, step and/or symbol. Element 31 may indicate connecting a BACnet device to a name server. Element 32 may indicate providing a shadow name table in the BACnet device. Element 33 may indicate looking up a name in the shadow name table to obtain an address associated with the name. Element 34 may indicate copying the address into a broadcast distribution table in the BACnet device. Element 35 may indicate providing an agent that looks up one or more names in the shadow name table and copies one or more addresses associated with the one or more names, respectively, to the broadcast distribution table. Element 36 may indicate adding another BACnet device connectable to a network and having a broadcast distribution table. Element 37 may indicate providing and updating the broadcast distribution table of the additional BACnet with information from the broadcast distribution table of the first BACnet device via a network.

To recap, a system, for providing addresses to a broadcast distribution table, may incorporate a BACnet device and a name server connected to the BACnet device. The BACnet device may incorporate a processor, and a memory connected to the processor. The memory may incorporate an agent, a broadcast distribution table connected to the agent, a shadow name table connected to the agent, and a device mechanism connected to the broadcast distribution table. The agent may look up one or more names in the shadow name table and copy one or more addresses associated with the one or more names, respectively, to the broadcast distribution table.

The agent may be a software program in the memory and be executed by the processor. To keep the broadcast distribution table updated, the agent may periodically look up one or more names in the shadow name table and copy one or more addresses associated with the one or more names, respectively, to the broadcast distribution table. The name server may be connectable to the BACnet device via a network.

The system may further incorporate one or more BACnet devices, having a protocol, connectable to a network, and each BACnet device having a broadcast distribution table. The first BACnet device may have the protocol and be connectable to the network. The first BACnet device may provide and update the broadcast distribution table of each BACnet device with information from the broadcast distribution table of the first BACnet device via the network. The broadcast distribution table may be a domain name system driven BACnet standard table.

An approach for providing addresses to a broadcast distribution table, may incorporate connecting a first BACnet device to a name server, providing a shadow name table in the first BACnet device, looking up a name in the shadow name table to obtain an address associated with the name, and copying the address into a broadcast distribution table in the first BACnet device. The first BACnet device may have a protocol and be connectable to a network. The broadcast distribution table may be a domain system driven table.

The approach may further incorporate providing an agent. The agent may look up one or more names in the shadow name table and copy one or more addresses, associated with the one or more names, respectively, to the broadcast distribution table.

The agent may be a software program in a memory and executed by a processor. To keep the broadcast distribution table updated, the agent may periodically look up one or more names in the shadow name table and copy one or more addresses associated with the one or more names, respectively, to the broadcast distribution table. The broadcast distribution table may be a BACnet standard table.

The approach may further incorporate connecting a second BACnet device to the first BACnet device via the network, and the second BACnet having a broadcast distribution table and a protocol, and updating the broadcast distribution table of the second BACnet with information from the broadcast distribution table of the first BACnet device via the network.

An arrangement, for providing addresses to a broadcast distribution table, may incorporate a name server, a first net device connected to the name server and having a broadcast distribution table, and a shadow name table situated in the first net device. A name may be looked up in the shadow name table to obtain an address associated with the name, and the address may be copied into the broadcast distribution table.

The first net device may have a protocol and be connectable to a network.

The arrangement may further incorporate an agent. The agent may look up one or more names in the shadow name table and copy one or more addresses, associated with the one or more names, respectively, to the broadcast distribution table.

The arrangement may further incorporate a second net device, having a protocol, connectable to the network, and having a broadcast distribution table. The first net device may update the broadcast distribution table of the second net with information from the broadcast distribution table of the first net device via the network.

The first net device may be a BACnet device. The second net device may be a BACnet device. The broadcast distribution table may be a BACnet standard table.

In the arrangement, the agent may be a software program in a memory of the first net device and be executed by a processor. To keep the broadcast distribution table updated, the agent may periodically look up one or more names in the shadow name table and copy one or more addresses associated with the one or more names, respectively, to the broadcast distribution table. The broadcast distribution table may be a domain name system driven table.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A system, for providing addresses to a broadcast distribution table, comprising:
    a BACnet device; and
    a name server connected to the BACnet device; and
    wherein:
    the BACnet device comprises:
        a processor; and
        a memory connected to the processor; and
        wherein the memory comprises:
            an agent;
            a broadcast distribution table connected to the agent;
            a shadow name table connected to the agent, wherein data in the shadow name table correspond to IP addresses in the broadcast distribution table; and
            a device mechanism connected to the broadcast distribution table; and
    the agent looks up one or more names in the shadow name table and copies one or more addresses associated with the one or more names, respectively, to the broadcast distribution table; and
    wherein the broadcast distribution table is a domain name system driven BACnet standard table.

2. The system of claim 1, wherein the agent is a software program in the memory and executed by the processor.

3. The system of claim 1, wherein to keep the broadcast distribution table updated, the agent looks up one or more names in the shadow name table and copies one or more addresses associated with the one or more names, respectively, to the broadcast distribution table.

4. The system of claim 1, wherein the name server is connectable to the BACnet device via a network.

5. The system of claim 1, further comprising:
    one or more BACnet devices, having a protocol, connectable to a network, and each BACnet device having a broadcast distribution table; and
    wherein:
    the first BACnet device has a protocol and is connectable to the network; and
    the first BACnet device provides and updates the broadcast distribution table of each BACnet device with information from the broadcast distribution table of the first BACnet device via the network.

6. A method, for providing addresses to a broadcast distribution table, comprising:
    connecting a first BACnet device to a name server;
    providing a shadow name table in the first BACnet device;
    looking up a name in the shadow name table to obtain an address associated with the name; and
    copying the address into a broadcast distribution table in the first BACnet device;
    wherein the broadcast distribution table is a domain name system driven BACnet standard table.

7. The method of claim 6, wherein the first BACnet device has a protocol and is connectable to a network.

8. The method of claim 7, further comprising:
    connecting a second BACnet device to the first BACnet device via the network, and the second BACnet having a broadcast distribution table and a protocol; and
    updating the broadcast distribution table of the second BACnet with information from the broadcast distribution table of the first BACnet device via the network.

9. The method of claim 6, wherein the broadcast distribution table is a domain system driven table.

10. The method of claim 6, further comprising:
    providing an agent; and
    wherein the agent looks up one or more names in the shadow name table and copies one or more addresses, associated with the one or more names, respectively, to the broadcast distribution table.

11. The method of claim 10, wherein:
    the agent is a software program in a memory and executed by a processor; and
    to keep the broadcast distribution table updated, the agent periodically looks up one or more names in the shadow name table and copies one or more addresses associated with the one or more names, respectively, to the broadcast distribution table.

12. An arrangement, for providing addresses to a broadcast distribution table, comprising:
    a name server;
    a first net device connected to the name server and having a broadcast distribution table; and
    a shadow name table situated in the first net device wherein data in the shadow name table correspond to an IP address in the broadcast distribution table; and
    wherein:
    the first net device is a BACnet device;
    a name is looked up in the shadow name table to obtain an address associated with the name; and
    the address is copied into the broadcast distribution table.

13. The arrangement of claim 12, wherein the first net device has a protocol and is connectable to a network.

14. The arrangement of claim 13, further comprising:
    an agent; and
    wherein the agent looks up one or more names in the shadow name table and copies one or more addresses, associated with the one or more names, respectively, to the broadcast distribution table.

15. The arrangement of claim 14, further comprising:
    a second net device, having a protocol, connectable to the network, and having a broadcast distribution table; and
    wherein the first net device updates the broadcast distribution table of the second net with information from the broadcast distribution table of the first net device via the network.

16. The arrangement of claim 14, wherein:
    the agent is a software program in a memory of the first net device and executed by a processor; and
    to keep the broadcast distribution table updated, the agent looks up one or more names in the shadow name table and copies one or more addresses associated with the one or more names, respectively, to the broadcast distribution table.

17. The arrangement of claim 15, wherein:
the second net device is a BACnet device; and
the broadcast distribution table is a BACnet standard table.

18. The arrangement of claim 14, wherein the broadcast distribution table is a domain name system driven table.

* * * * *